United States Patent [19]

Usui

[11] Patent Number: 4,953,896
[45] Date of Patent: * Sep. 4, 1990

[54] STRUCTURE FOR CONNECTING BRANCH PIPE IN HIGH-PRESSURE FUEL MANIFOLD

[75] Inventor: Masayoshi Usui, Numazu, Japan

[73] Assignee: Usui Kokusai Sangyo Kaisha Ltd., Japan

[*] Notice: The portion of the term of this patent subsequent to May 23, 2006 has been disclaimed.

[21] Appl. No.: 211,969

[22] Filed: Jun. 27, 1988

[30] Foreign Application Priority Data

Jun. 29, 1987 [JP] Japan .................. 62-99724

[51] Int. Cl.$^5$ .............................. F16L 41/00
[52] U.S. Cl. .................. 285/197; 285/333; 285/393; 285/357; 285/158; 403/234; 403/254; 403/263; 403/191
[58] Field of Search .............. 285/189, 197, 333, 357, 285/353, 393, 332, 199, 158; 403/233, 234, 235, 253, 254, 263, 241, 190, 191, 392

[56] References Cited

U.S. PATENT DOCUMENTS

| 150,109 | 4/1874 | Duzer | 285/332.1 X |
|---|---|---|---|
| 1,487,787 | 3/1924 | Loeffler | 285/332.1 |
| 3,779,272 | 12/1973 | Dunmire | 285/197 X |
| 4,073,513 | 2/1978 | Blakeley | 285/197 |
| 4,586,733 | 5/1986 | Anderson | 285/386 |
| 4,832,376 | 5/1989 | Sugao | 285/197 X |

Primary Examiner—Randolph A. Reese
Assistant Examiner—Carol I. Bordas
Attorney, Agent, or Firm—Anthony J. Casella; Gerald E. Hespos

[57] ABSTRACT

A structure for connecting a branch pipe in a high-pressure fuel manifold employs a nut to fasten the branch pipe to a main pipe, the nut having threaded surfaces which are simultaneously brought into thread engagement with the branch pipe and a coupling member which is secured to the main pipe in such a manner as to surround the peripheral wall thereof. Therefore, it becomes unnecessary to conduct a welding operation which has heretofore been needed to connect the joint portion of the branch pipe to the main pipe. The connecting structure satisfactorily endures ultra-high fluid pressure even under vibrations. In addition, there is no fear of fuel leaking out through the joint nor risk of the branch pipe coming off.

6 Claims, 1 Drawing Sheet

U.S. Patent
Sep. 4, 1990
4,953,896
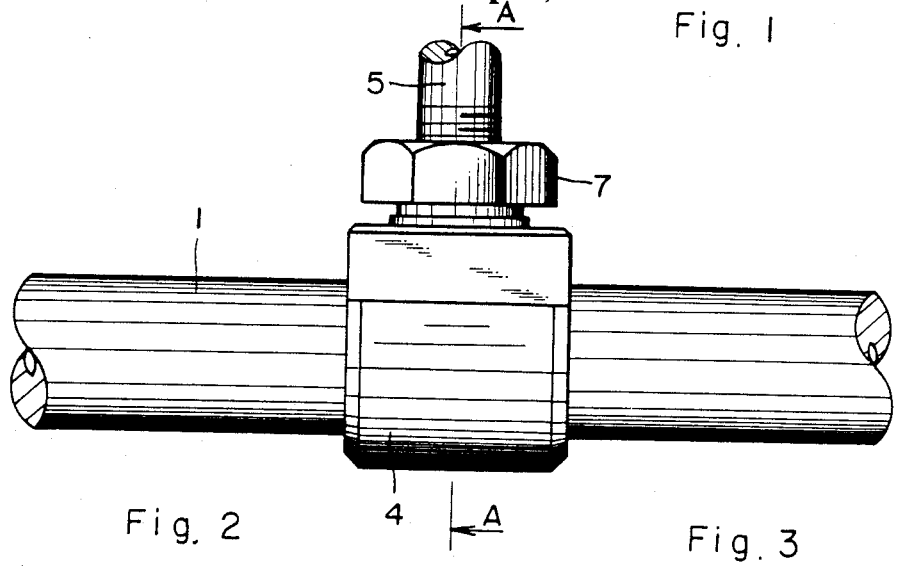
Fig. 1
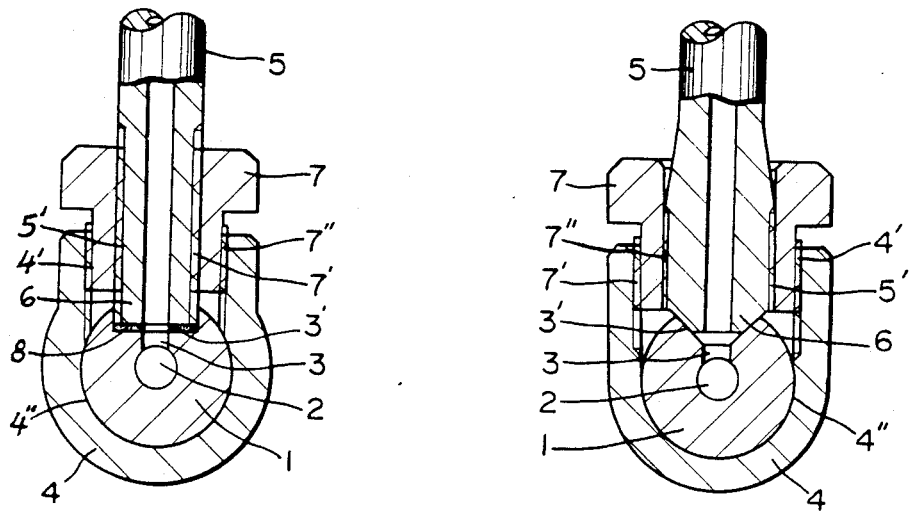
Fig. 2
Fig. 3
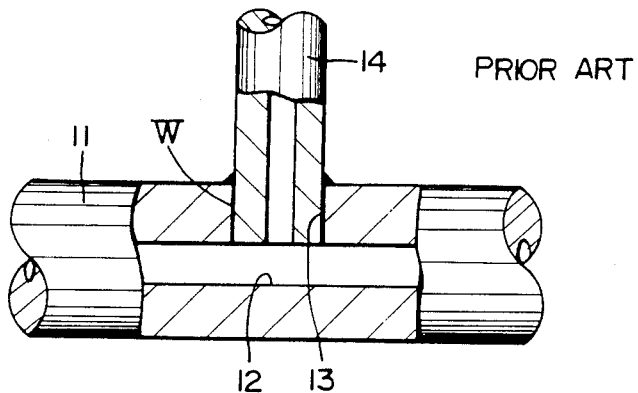
Fig. 4  PRIOR ART

4,953,896

STRUCTURE FOR CONNECTING BRANCH PIPE IN HIGH-PRESSURE FUEL MANIFOLD

BACKGROUND OF THE INVENTION

1. Field of the Invention

The present invention relates to a structure for connecting branch pipes in a high-pressure fuel manifold generally employed in diesel engines of various kinds of vehicle or the like. More particularly, the present invention pertains to an improvement in the structure for connecting branch pipes in a high-pressure fluid manifold which is disposed near such a diesel engine so as to serve as a passage for supplying the engine with fuel under an ultra-high pressure, i.e., 1000 kg/cm$^2$ or more.

2. Description of the Related Art

FIG. 4 shows one example of the conventional connecting structure of the type described above. As illustrated, a plurality of through-holes 13 are provided in the peripheral wall of a main pipe 11 for supplying high-pressure fuel in such a manner that the through-holes 13 are spaced apart from each other in the longitudinal direction of the main pipe 11 and are communicated with a flow passage 12 defined inside the main pipe 11, and a branch pipe 14 is fitted into each through-hole 13 and brazed or welded to the main pipe 11 as shown by the reference symbol W, thus connecting the branch pipe 14 to the main pipe 11.

The above-described prior art suffers, however, from the problem that leakage of fuel through the weld W or coming off of the branch pipe 14 often occurs as the weld strength deteriorates due to the above-described fitting engagement between the branch pipe 14 and the main pipe 11 and incomplete welding despite the fact that there are demands for sufficiently high weld strength at the joint to endure the repetitive supply of fuel under ultra-high fluid pressure, i.e., 1000 kg/cm$^2$ or more, during use, as a result of the improvement in the engine mechanism, and also vibrations applied from the engine.

SUMMARY OF THE INVENTION

In view of the above-described problems of the prior art, it is a primary object of the present invention to provide a connecting structure which enables a branch pipe to be readily connected to a main pipe without the need for welding or the like at the joint and permits the joint to satisfactorily endure the above-described ultra-high fluid pressure even under vibrations and which has no fear of the fuel leaking out through the joint nor risk of the branch pipe coming off the main pipe.

To this end, the present invention provides a structure for connecting branch pipes in a high-pressure fuel manifold in which each branch pipe is connected to a main pipe for supplying fuel under high pressure through one of a plurality of through-holes which are provided in the peripheral wall of the main pipe in such a manner that the through-holes ar spaced apart from each other in the longitudinal direction of the main pipe and are communicated with a flow passage defined inside the main pipe, wherein the improvement comprises: a recessed pressure bearing surface provided at the outer end of each of the through-holes so as to open outward; a coupling member having a threaded bore at one lateral end thereof and an engagement bore axially provided therein, the coupling member being secured at the engagement bore to the outer peripheral wall of the main pipe in such a manner that the pressure bearing surface is surrounded by the wall that defines the threaded bore; the branch pipe having a joint end portion and a threaded surface defined by the outer periphery of its end portion; and a nut provided on the branch pipe, the nut having threaded surfaces respectively provided on its inner and outer peripheries which are threaded in the directions opposite to each other, so that the joint end portion of the branch pipe is brought into contact and thereby engaged with the pressure bearing surface and, in this state, the nut is tightened such that the inner and outer threaded surfaces of the nut are respectively brought into thread engagement with the threaded surface of the branch pipe and the threaded bore provided in the coupling member, thereby fastening the branch pipe to the main pipe. The joint end portion of the branch pipe may be formed so as to have a frusto-conical or abacus counter-shaped top portion. In such a case, the threaded surface of the branch pipe is defined by the outer periphery of the top portion, and the pressure bearing surface is formed into a conical or arcuated shape.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote line elements and, in which:

FIG. 1 is a front view of one embodiment of the structure for connecting branch pipes in a high-pressure fuel manifold according to the present invention;

FIG. 2 is a partly-sectioned side view of the embodiment, taken along the line A—A of FIG. 1;

FIG. 3 shows another embodiment of the present invention, which is equivalent to FIG. 3; and FIG. 4 is a partly-sectioned front view of a prior art.

DESCRIPTION OF THE PREFERRED EMBODIMENTS

Preferred embodiments of the present invention will be described hereinunder in detail with reference to the accompanying drawings.

Referring to FIGS. 1 to 3, the reference numeral 1 denotes a main pipe defined by a metal pipe having a relatively small outside diameter, i.e., about 20 mm, and a relatively large wall thickness, i.e., about 6 mm, and a plurality of through-holes 3 are provided in the peripheral wall of the main pipe 1 in such a manner that the through-holes 3 are spaced apart from each other in the longitudinal direction of the main pipe 1 and are communicated with a flow passage 2 defined inside the main pipe 1, each through-hole 3 having at its outer end a recessed pressure bearing surface 3' which opens outward. The reference numeral 4 denotes a coupling member defined by a relatively short annular member or ring-shaped member having a square cross-section which is prepared as a separate member. The coupling member 4 has a threaded bore 4' at its upper end as viewed in the figures and is secured a its axial engagement bore 4" to the outer peripheral wall of the main pipe 1 by welding or other similar means in such a manner that the pressure bearing surface 3' is surrounded by the wall that defines the threaded bore 4'. A branch pipe 5 has a threaded surface 5' defined by the outer periphery of its end portion. According to one embodiment of the present invention, the branch pipe 5 is provided with a joint end portion 6 having a flat surface perpendicular to the axis of the branch pipe 5, and the joint end portion 6 is brought into contact and thereby engaged with the flat pressure bearing surface 3' with a seal member 8, for example, a copper packing member, interposed therebetween (see FIG. 2). According to another embodiment of the present invention, the joint end portion 6 is formed so as to have a frustoconical conical or abacus counter-shaped top portion, the threaded surface 5' being provided on the outer periphery of this top portion, and the joint end portion 6 is brought into contact and thereby engaged with a conical or arcuated pressure bearing surface 3' (see FIG. 3). In either case, the branch pipe 5, which is in the above-described state, is then fastened to the main pipe 1 by tightening a nut 7 provided on the branch pipe 5 such that the inner and outer peripheral surfaces 7' and 7" of the nut 7 which are threaded in the directions opposite to each other are brought into thread engagement with the threaded surface 5' of the branch pipe 5 and the threaded bore 4' provided in the coupling member 4.

Thus, the joint end portion 6 of the branch pipe 5 is brought into contact and thereby engaged with the pressure bearing surface 3' by means of the coupling member 4 secured to the main pipe 1 in such a manner as to wrap the peripheral wall thereof and the joint end portion 6 is then strongly pressed against the pressure bearing surface 3' by tightening the nut 7 having the threaded surfaces 7' and 7" which are simultaneously brought into thread engagement with the branch pipe 5 and the coupling member 4, respectively. In this way, the branch pipe 5 is firmly connected to the main pipe 1.

As has been described above, according to the present invention, the branch pipe 5 is connected to the main pipe 1 by means of the nut 7 having the threaded surfaces 7' and 7" which are simultaneously brought into thread engagement with the branch pipe 5 and the coupling member 4 which is secured to the main pipe 1 in such a manner as to surround the peripheral wall thereof. Therefore, it becomes unnecessary to conduct a welding operation which has heretofore been needed to connect the joint portion of the branch pipe to the main pipe, and it is possible to facilitate the connecting operation by means of the thread engagement using the nut 7. Further, since the coupling member 4 is secured to the main pipe 1 in such a manner that the main pipe 1 is wrapped with the coupling member 4 by being received in the engagement bore 4", the connecting structure can satisfactorily endure ultra-high fluid pressure even under vibrations. In addition, there is no fear of fuel leaking out through the joint nor risk of the branch pipe 5 coming off. Thus, the present invention provides a considerably advantageous connecting structure.

Although the present invention has been described through specific terms, it should be noted here that the described embodiments are not necessarily exclusive and various changes and modifications may be imparted thereto without departing from the scope of the invention which is limited solely by the appended claims.

What is claimed is:

1. A structure for connecting branch pipes to a main pipe in a high-pressure fuel manifold, comprising:
   a main pipe for supplying fuel under high pressure, said main pipe having a peripheral wall and a longitudinally extending flow passage defined therein, said main pipe comprising at least one through-hole extending laterally through the peripheral wall and communicating with the longitudinally extending flow passage, portions of said peripheral wall surrounding said through-hole defining an outwardly opening recessed pressure bearing surface;
   a coupling member having an axially aligned engagement bore extending therethrough and a laterally extending threaded bore extending therethrough and into communication with the axially extending engagement bore, said coupling member being disposed over the main pipe such that the axially extending engagement bore of said coupling member is mounted in engagement with the peripheral wall of said main pipe and such that the laterally extending threaded bore of said coupling member substantially surrounds the outwardly opening recessed pressure bearing surface of said main pipe, said coupling member being secured to the peripheral wall of said main pipe;
   a nut having opposed inner and outer peripheries, the inner and outer peripheries of said nut defining respective inner and outer threaded surfaces, the outer threaded surface of said nut being threadedly engaged with the threaded bore of said coupling member, the inner threaded surface of said nut being threaded in an opposite direction to the outer threaded surface thereof; and
   a branch pipe having a joint end portion of a configuration conforming to the shape of the outwardly opening recessed pressure bearing surface of the main pipe, said branch pipe having a threaded outer surface adjacent the end portion thereof, said threaded outer surface of said branch pipe being threadedly engaged with the inner threaded surface of said nut, said nut being threadedly tightened relative to said coupling member and said branch pipe such that the joint end portion of said branch pipe is pressed against the outwardly opening recessed pressure bearing surface of the main pipe for achieving secure connection between the branch pipe and the main pipe for delivering high-pressure fuel therebetween.

2. A structure as in claim 1 wherein the branch pipe has a through passage having a cross section approximately equal to the cross section of the through-hole in the main pipe adjacent to the flow passage of the main pipe.

3. A structure as in claim 1 wherein the joint end portion of said branch pipe and the outwardly opening recessed pressure bearing surface of said main pipe are of substantially identical frusto-conical configurations.

4. A structure as in claim 1 wherein the coupling member is secured to the peripheral wall of the main pipe by welding.

5. A structure as in claim 1 wherein the main pipe has an outside diameter of about 20 mm and a peripheral wall thickness of about 6 mm.

6. A structure as in claim 1 wherein each said through-hole is further defined by a generally cylindrical portion extending between the outwardly opening recessed pressure bearing surface thereof and the flow passage of the main pipe.

* * * * *